US009992739B2

(12) United States Patent
Rune (10) Patent No.: US 9,992,739 B2
(45) Date of Patent: Jun. 5, 2018

(54) PROACTIVE RADIO RESOURCE ALLOCATION

(71) Applicant: Telefonaktiebolaget L M Ericsson (publ), Stockholm (SE)

(72) Inventor: Johan Rune, Lidingö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 100 days.

(21) Appl. No.: 14/900,694

(22) PCT Filed: Jun. 28, 2013

(86) PCT No.: PCT/SE2013/050821
§ 371 (c)(1),
(2) Date: Dec. 22, 2015

(87) PCT Pub. No.: WO2014/209189
PCT Pub. Date: Dec. 31, 2014

(65) Prior Publication Data
US 2016/0150475 A1     May 26, 2016

(51) Int. Cl.
*H04Q 7/00*      (2006.01)
*H04W 52/02*    (2009.01)
(Continued)

(52) U.S. Cl.
CPC ... *H04W 52/0216* (2013.01); *H04W 52/0219* (2013.01); *H04W 72/042* (2013.01);
(Continued)

(58) Field of Classification Search
CPC ........... H04W 52/0216; H04W 72/048; H04W 76/046; H04W 52/0219; H04W 72/042; H04W 76/04; Y02B 60/50
(Continued)

(56) References Cited

U.S. PATENT DOCUMENTS 8,989,092 B2 * 3/2015 Xing ...................... H04W 4/001
370/328
2010/0135176 A1 * 6/2010 Kazmi .................. H04W 24/08
370/252
(Continued)

FOREIGN PATENT DOCUMENTS

| WO | 2011129674 A2 | 10/2011 |
| WO | 2012045369 A1 | 4/2012 |
| WO | 2014171882 A2 | 10/2014 |

OTHER PUBLICATIONS

ZTE, "RACH congestion and potenial solutions", 3GPP TSG RAN WG2 #70, Montreal, Canada, May 10, 2010, pp. 1-6, R2-102824, 3GPP.
(Continued)

*Primary Examiner* — Chuong T Ho (74) *Attorney, Agent, or Firm* — Coats & Bennett, PLLC (57) ABSTRACT

The present disclosure concerns radio communication. More particularly, the embodiments presented herein generally relate to allocation of radio resources. In one example embodiment, a radio network node 700 determines that an operational status of a user equipment (UE) is an operational status where the UE is in transition from an IDLE mode to a CONNECTED mode. In response thereto, the radio network node 700 determines a radio resource allocation for the UE. Also in response thereto, the radio network node 700 may proactively transmit a data message indicating the determined radio resource allocation to the UE.

13 Claims, 7 Drawing Sheets

(51) Int. Cl.
*H04W 76/04* (2009.01)
*H04W 72/04* (2009.01)

(52) U.S. Cl.
CPC ......... *H04W 72/048* (2013.01); *H04W 76/04* (2013.01); *H04W 76/046* (2013.01); *Y02B 60/50* (2013.01)

(58) Field of Classification Search
USPC ........................................ 370/328, 329, 330
See application file for complete search history.

(56) References Cited

U.S. PATENT DOCUMENTS

| | | | | |
|---|---|---|---|---|
| 2010/0323710 | A1* | 12/2010 | Chen | H04W 74/004 455/450 |
| 2013/0329637 | A1* | 12/2013 | Kodali | H04W 76/046 370/328 |
| 2014/0098740 | A1* | 4/2014 | Xing | H04W 4/001 370/328 |
| 2014/0254359 | A1* | 9/2014 | Alisawi | H04W 28/0284 370/230 |
| 2015/0271727 | A1* | 9/2015 | Harrang | H04W 36/22 370/229 |

OTHER PUBLICATIONS

Ericsson, "Handling of UE capability information in SAE/LTE", 3GPP TSG-RAN WG2 #57-bis, St. Julian, Malta, Mar. 26, 2007, pp. 1-4, R2-071328, 3GPP.
Via Telecom, "Access Procedure Enhancements for MTC Applications", 3GPP TSG-RAN WG2 Meeting #70bis, Stockholm, Sweden, Jun. 28, 2010, pp. 1-4, R2-103968, 3GPP.

* cited by examiner

PROACTIVE RADIO RESOURCE ALLOCATION

TECHNICAL FIELD

Embodiments of the present invention presented herein generally relate to radio communication. More particularly, the embodiments presented herein generally relate to allocation of radio resources.

BACKGROUND

Radio communication networks are widely deployed to provide various communication services such as telephony, video, data, messaging, broadcasts, and so on. Such communication networks generally support communications for multiple user equipments (UEs) by sharing available network resources. One example of such a network is the Universal Mobile Telecommunications System (UMTS), a third generation (3G) mobile phone technology standardized by the 3rd Generation Partnership Project (3GPP). UMTS includes a definition for a Radio Access Network (RAN), referred to as Universal Terrestrial Radio Access Network (UTRAN). The UMTS, which is the successor to Global System for Mobile Communications (GSM) technologies, supports various air interface standards, such as Wideband Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with mobile communications. For example, UMTS based on WCDMA has been deployed in many places around the world. To ensure that this system remains competitive in the future, 3GPP began a project to define the long-term evolution of UMTS cellular technology. The specifications related to this effort are formally known as Evolved UMTS Terrestrial Radio Access (EUTRA) and Evolved UMTS Terrestrial Radio Access Network (EU-TRAN), but are more commonly referred to by the name Long Term Evolution (LTE). The corresponding specifications for the core network side are commonly referred to as System Architecture Evolution (SAE) or Evolved Packet Core (EPC) (where EPC according to the most common definition is a subset of SAE). Together, SAE and LTE/EUTRAN form a complete cellular system referred to as Evolved Packet System (EPS). More detailed descriptions of radio communication networks and systems can be found in literature, such as in Technical Specifications published by, e.g., the 3GPP.

A currently popular vision of the future development of the communication in radio communication networks comprises huge numbers of relatively small autonomous devices, which typically, more or less infrequently (e.g. once per week to once per minute) transmit and receive only small amounts of data (or, alternatively, are polled for data). These devices are not assumed to be associated with humans, but are rather sensors or actuators of different kinds, which communicate with application servers (which configure the devices and receive data from them) within or outside the cellular radio network. Hence, this type of communication is often referred to as machine-to-machine (M2M) communication and the devices may be denoted machine devices (MDs). In the 3GPP standardization, the corresponding alternative terms are machine type communication (MTC) and machine type communication devices (MTC devices), with the latter being a subset of the more general term UE. More detailed descriptions of MTC communication can be found in literature, e.g., in the 3GPP Technical Specification TS 22.368 V. 12.2.0.

With the nature of MTC devices and their assumed typical uses follow that these devices will often have to be energy efficient, since external power supplies will often not be available and since it is neither practically nor economically feasible to frequently replace or recharge their batteries. In some scenarios, the MTC devices may not even be battery powered, but may instead rely on energy harvesting, e.g. gathering energy from the environment, that is, utilizing (the often limited) energy that may be tapped from sun light, temperature gradients, vibrations, etc. For such energy deprived devices, whose traffic is characterized by relatively small and more or less infrequent transactions (often delay tolerant), it may be important to minimize their energy consumption, e.g. between and in combination with the communication events. These devices generally consume energy between the various communication events, e.g. by keeping the radio receiver active to monitor transmissions from the cellular network. Since the periods between the communication events are generally much longer than the actual communication events, this energy consumption may represent a significant part of the overall energy consumption and may even dominate the energy consumption in scenarios where the communication events are infrequent or very infrequent.

Figure 1:
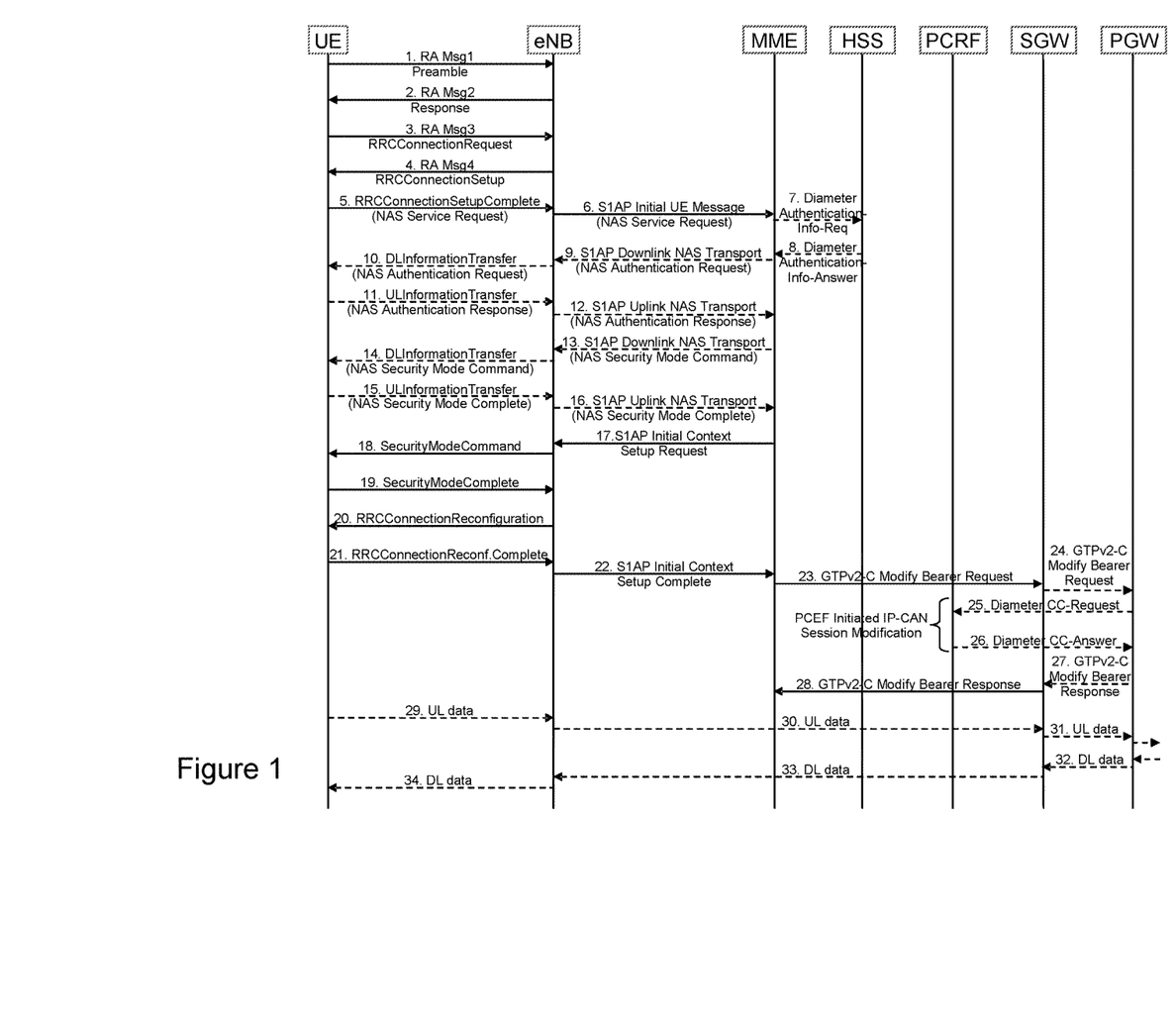
FIG. 1 shows a signaling diagram during a time period when a UE transitions from an idle mode to a connected mode.

During the communication events the actual uplink (UL) transmissions naturally consume significant amounts of energy. This may be magnified by the relatively large control signaling overhead that may be associated with a certain communication event, especially since an infrequently communicating MTC device (or other UE) will go through the idle to connected mode transition prior to every communication event. FIG. 1 shows an exemplary signaling diagram illustrating an example message sequence during the idle to connected mode transition in LTE. As can be seen, the signaling procedure involved during idle to connected mode transition for a UE may be relatively extensive.

A mechanism that has been introduced in radio communication networks in order to save energy in the UEs, e.g. between communication events, is discontinuous reception (DRX), which allows a UE to remain in an energy-saving sleep state most of the time, while waking up to listen for pages in idle mode DRX or downlink (DL) resource assignments (i.e. downlink transmissions) in connected mode DRX at specific occasions as configured by the network. Furthermore, in order to make the DRX mechanism even more effective for energy deprived MTC devices, 3GPP is currently working on extending the maximum DRX cycle length, and thus the sleep period, both for the idle mode DRX cycle and the connected mode DRX cycle. A DRX cycle thus essentially consists of a sleep period followed by an active period and this cycle is repeated over and over again until the device is detached from the network or the DRX configuration is changed. Typically, but not necessarily, the sleep period is longer than the active period. The idle mode DRX cycle, i.e., the paging cycle, is generally configured in the UE through parameters in the system information (SI) that is broadcast in each radio cell, in combination with UE specific parameters in the form of IMSI modulo 1024, and an optional UE specific DRX cycle length. Alternatively, it is also possible to configure a UE specific paging cycle. The connected mode DRX cycle and other DRX parameters (when used) are configured in the UE through optional parameters typically in the RRCConnectionReconfiguration message (RRC is an abbreviation of Radio Resource Control), or later in connected mode. A more detailed description of DRX mechanisms can be found in literature, such as in the reference book 4G LTE/LTE-Advanced for Mobile Broadband by Erik Dahlman, Stefan Parkvall and Johan Sköld, Academic Press, 2011, ISBN: 978-0-12-385489-6. As will be appreciated, the DRX mechanisms are defined for both idle mode and connected mode. Generally speaking, these DRX mechanisms are good UE energy saving mechanisms.

However, when the communication events are short and infrequent, each communication event is likely to be preceded by an idle to connected mode transition, and this transition is likely to take a significant portion of time from the whole time needed to perform the data transmission. The potential use of long connected mode DRX cycles may increase the risk of radio link failure during mobility between radio cells, which means that idle to connected mode transition may be triggered many times in such scenarios too. In addition, since the connection setup procedure often involves exchange of a large number of signaling messages, this control plane communication is likely to dominate i.e. comprise more messages, larger data volumes and consume more energy, over the user plane communication. Furthermore, since the signaling procedure involves many nodes in the network as well as significant processing in the network nodes, e.g. in order to set the appropriate configuration parameters, the time intervals separating the messages may be significant. Hence, having the MTC device (or other UE) actively listening for downlink transmissions during the entire idle to connected mode transition, due to the lack of DRX sleep mode possibilities, may cause a relatively high UE energy consumption in some scenarios. In turn, this may have a significant negative impact on the battery lifetime of a UE, e.g. a MTC device.

The U.S. patent application 61/811,961 which was filed on Apr. 15, 2013 by Telefonaktiebolaget LM Ericsson (publ.), introduces a different way of reducing energy consumption of a UE. In one of its aspects, U.S. 61/811,961 introduces the possibility for a user equipment (UE) to apply a temporary DRX cycle during the time period when the UE transitions from an idle mode (e.g. RRC_IDLE) to a connected mode (e.g. RRC_CONNECTED). Applying a temporary DRX cycle in the time period between idle mode and connected mode may provide for several advantages. For example, this may allow the UE to save power during its transition from the idle mode to the connected mode.

SUMMARY

It is in view of the above considerations and others that the various embodiments disclosed herein have been made.

The inventor has realized that there is still a need to provide alternative, or improved, ways of reducing energy consumption of UEs. It is therefore an aim to provide an alternative, or improved, way of reducing energy consumption of a UE. The various embodiments of the present invention as set forth in the appended independent claims address this general aim. The appended dependent claims represent additional advantageous embodiments of the present invention.

In one of its aspects, the technology presented herein concerns a method performed by, or otherwise implemented in, a radio network node (e.g., an evolved NodeB) for radio resource allocation. The method comprises determining that an operational status of a user equipment (UE) is an operational status where the UE is in transition from an idle mode (e.g., a RRC_IDLE state) to a connected mode (e.g., a RRC_CONNECTED state); in response thereto determining a radio resource allocation for the UE; and furthermore proactively transmitting a data message indicating the determined radio resource allocation to the UE.

In some embodiments, determining that the operational status of the UE is an operational status where the UE is in transition from the idle mode to the connected mode may for example comprise receiving a data message indicative of the UE requesting a transition from the idle mode to the connected mode; and interpreting said received data message as an indication that the UE is in transition from an idle mode to a connected mode. In one embodiment, determining that the operational status of the UE is an operational status where the UE is in transition from the idle mode to the connected mode comprises receiving a random access message 1, RA Msg1, from the UE. The RA Msg1 may comprise a random access preamble. In an alternative embodiment, determining that the operational status of the UE is an operational status where the UE is in transition from the idle mode to the connected mode comprises receiving a random access message 3, RA Msg3, from the UE. The RA Msg3 may comprise a RRCConnectionRequest.

In an advantageous embodiment, the method comprises predicting one or more data messages that the UE will transmit to the radio network node during its transition from the idle mode to the connected mode; and determining the radio resource allocation for the UE on the basis of said predicted one or more data messages. In one embodiment, said prediction of the one or more data messages that the UE will transmit to the radio network node during its transition from the idle mode to the connected mode comprises collecting historical data of data messages communicated by one or several UEs during previous transitions from idle mode to connected mode; and predicting the one or more data messages that the UE will transmit to the radio network node on the basis of the collected historical data.

In some embodiments, proactively transmitting the data message indicating the determined radio resource allocation to the UE comprises transmitting a downlink (DL) message comprising a data field indicating uplink (UL) transmission resources allocated to the UE. For example, transmitting a DL message may comprise transmitting a Medium Access Control (MAC) Protocol Data Unit (PDU) to the UE, wherein an UL Grant field of the MAC PDU comprises an indication indicating UL transmission resources allocated to the UE. If so, the method may further comprise manipulating a content of a regular UL Grant field of the MAC PDU by altering (e.g. changing, adjusting or modifying) one or more bits of the regular UL Grant field to include the indication indicating UL transmission resources allocated to the UE. Moreover, said indication indicating UL transmission resources allocated to the UE may additionally comprise an indication indicating a point in time when the allocated UL transmission resources allocated to the UE are to be utilized by the UE.

In some embodiments, the method comprises transmitting (e.g. broadcasting) a System Information (SI) message to the UE, wherein the SI message comprises a data field indicating a point in time when allocated UL transmission resources allocated to the UE are to be utilized by the UE.

In still further embodiments, the method additionally comprises receiving a data message from the UE, said data message comprising an indication to the radio network node that the UE requests the radio network node to determine a radio resource allocation for the UE taking the transition from the idle mode to the connected mode of the UE into consideration. Thus, this data message can be seen as a data message comprising an indication to the radio network node that the UE requests the radio network node determine a radio resource allocation for the UE and proactively return (i.e. transmit) a data message indicating the determined radio resource allocation to the UE. In these further embodiments, determining the radio resource allocation for the UE may be performed in response to, or as a consequence of, receiving said data message comprising the indication that the UE requests the radio network node to determine the radio resource allocation for the UE taking the transition from the idle mode to the connected mode of the UE into consideration.

In another of its aspects, the technology presented herein concerns a method performed by, or otherwise implemented in, a user equipment. The method comprises transmitting a first data message to a radio network node, the first data message being indicative of the UE requesting a transition from an idle mode to a connected mode. The method also comprises transmitting a second data message, which second data message comprises an indication that the UE requests the radio network node to determine a radio resource allocation for the UE taking the transition from the idle mode to the connected mode of the UE into consideration. In response, the method comprises receiving a data message including a radio resource allocation from the radio network node. The first data message and the second data message may be separate messages. Alternatively, the first and second messages could be the same data message. That is, the first and second data messages can be transmitted as a single data message.

In still another of its aspects, the technology presented herein concerns a radio network node for radio resource allocation. The radio network node may be an evolved NodeB. The radio network node may comprise an operational status determination unit configured to determine that an operational status of a user equipment, UE, is an operational status where the UE is in transition from an idle mode to a connected mode; a radio resource allocation determination unit configured to determine a radio resource allocation for the UE; and a transmitter configured to proactively transmit a data message indicating the determined radio resource allocation to the UE.

The radio network node may also comprise a prediction unit configured to predict one or more data messages the UE will transmit to the radio network node during its transition from the idle mode to the connected mode. The radio resource allocation determination unit may be further configured to determine the radio resource allocation for the UE on the basis of one or more data messages predicted by the prediction unit.

In still another of its aspects, the technology presented herein concerns a user equipment (UE). The UE may be a Machine Type Communication (MTC) device. The UE comprises a transmitter and a receiver. The transmitter may be configured to transmit a first data message to a radio network node, the first data message being indicative of the UE requesting a transition from an idle mode to a connected mode. The transmitter may also be configured to transmit a second data message, which second data message comprises an indication that the UE requests the radio network node to determine a radio resource allocation for the UE taking the transition from the idle mode to the connected mode of the UE into consideration. In response, the receiver may be configured to receive a data message including a radio resource allocation from the radio network node. The first data message and the second data message may be separate messages. Alternatively, the first and second messages could be the same data message. That is, the first and second data messages can be transmitted as a single data message by the transmitter.

As used herein, proactively transmitting the data message indicating the determined radio resource allocation to the UE means that no scheduling request need to be received from the UE prior to the radio network node transmitting the data message indicating the determined radio resource allocation to the UE. Or said differently, the radio network node does not have to receive any scheduling request from the UE before it transmits the data message indicating the determined radio resource allocation to the UE. Thus, the data message indicating the determined radio resource allocation to the UE can be proactively transmitted to the UE without any preceding reception of a scheduling request from the UE. It should also be appreciated that the proactive transmission of the data message indicating the determined radio resource allocation to the UE may be performed simultaneously, or essentially simultaneously, as a DL transmission during an idle-to-connected mode transition. Consequently, a UE may receive the data message indicating the determined radio resource allocation to the UE when it is anyway receiving a DL transmission. Thus, the UE does not need to monitor and receive any DL channel solely for the purpose of receiving the data message proactively transmitted from the radio network node. In an advantageous embodiment, the method comprises predicting one or more data messages that the UE will transmit to the radio network node during its transition from the idle mode to the connected mode; and determining the radio resource allocation for the UE on the basis of said predicted one or more data messages. In such embodiment, the transmission of the data message indicating the determined radio resource allocation to the UE can be made proactive in dependence of the prediction of the one or more data messages that the UE will transmit to the radio network node during its transition from the idle mode to the connected mode. Consequently, the radio network node can act proactively in advance based on an expected behavior of the UE during its transition from idle to connected mode.

The various embodiments described herein may provide several advantages. For example, by proactively transmitting the data message indicating the determined radio resource allocation to the UE there is no need for the UE to first transmit a scheduling request to the radio network node. This means that the UE may reduce its total power consumption, e.g. during its transition from idle to connected mode. Also, this may save battery power of the UE. In addition, as another potential advantage, the proactive transmission may coincide with transmission of other DL information to the same UE, which means that the UE does not have to monitor a DL control channel for resource allocations. This may also save energy.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The invention will now be described more fully hereinafter with reference to the accompanying drawings, in which certain embodiments are shown. The invention may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps throughout the description.

In one of its aspects, the technology presented herein concerns a proactive resource allocation during a time period when a UE is in transition from an idle mode (e.g. RRC_IDLE) to a connected mode (e.g. RRC_CONNECTED). As will be further detailed herein, by employing the proactive resource allocation presented herein it is made possible to allow a UE to save battery power, since the UE can reduce its energy consumption.

Figure 2A:
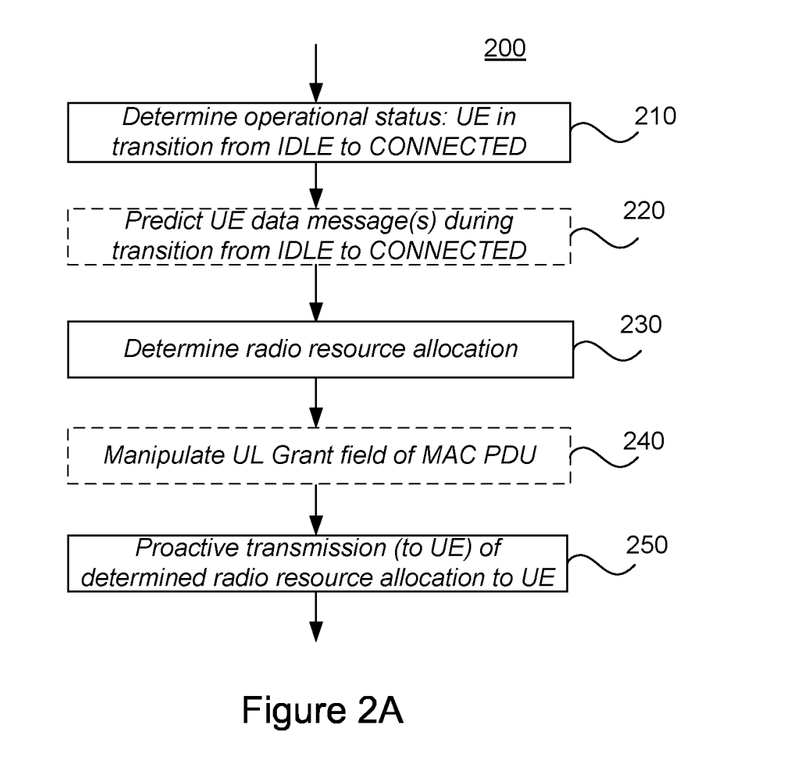
FIG. 2 shows flowcharts of example methods performed by a radio network node.

As used in this disclosure, the term "user equipment (UE)" is used to mean any device, which can be used by a user to communicate. Also, the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC devices, which do not necessarily involve human interaction. Also, the term "radio network node" as used herein generally denotes a fixed point being capable of communicating with the UE. As such, it may be referred to as a base station, a radio base station, a NodeB or an evolved NodeB (eNB), a Radio Network Controller (RNC), access point, etcetera. Within the context of this disclosure it should be understood that the term "radio network node" may denote a node that is not necessarily part of what is typically referred to as a "radio access network", e.g. a Mobility Management Entity (MME), a Serving General Packet Radio Service Support Node (SGSN), a Home Subscriber Server (HSS) or a Home Location Register (HLR) to name a few examples FIG. 2 illustrates an example method 200 according to one embodiment of the invention. The method 200 shown in FIG. 2 is performed by a radio network node, such as for example an eNB. Referring to FIG. 2A, the method 200 comprises determining 210 that an operational status of a UE is an operational status where the UE is in transition from an idle mode (e.g., RRC_IDLE) to a connected mode (e.g., RRC_CONNECTED). In response to determining that the UE is in this operational status, i.e. in a transition from idle mode to connected mode, a radio resource allocation is determined 230. Furthermore, a data message indicating the determined radio resource allocation is proactively transmitted 250 to the UE.

As described earlier, the proactive transmission 250 of the data message indicating the determined radio resource allocation to the UE means that no scheduling request need to be received from the UE prior to the radio network node transmitting 250 this data message. Or said differently, the radio network node does not have to receive any scheduling request from the UE prior to transmitting 250 this data message. Consequently, the data message indicating the determined radio resource allocation to the UE can be proactively transmitted to the UE without any preceding reception of a scheduling request from the UE. Since the UE does not have to transmit any scheduling request to the radio network node before receiving the data message transmitted 250 proactively by the radio network node, the UE may consume less energy. It should also be appreciated that the proactive transmission of the data message indicating the determined radio resource allocation to the UE may, in some embodiments, be performed simultaneously (or essentially simultaneously) as a DL transmission during an idle-to-connected mode transition. Consequently, a UE may receive the data message indicating the determined radio resource allocation to the UE when it is anyway receiving a DL transmission. Thus, the UE does not need to monitor and receive any DL channel solely for the purpose of receiving the data message proactively transmitted from the radio network node.

Figure 2B:
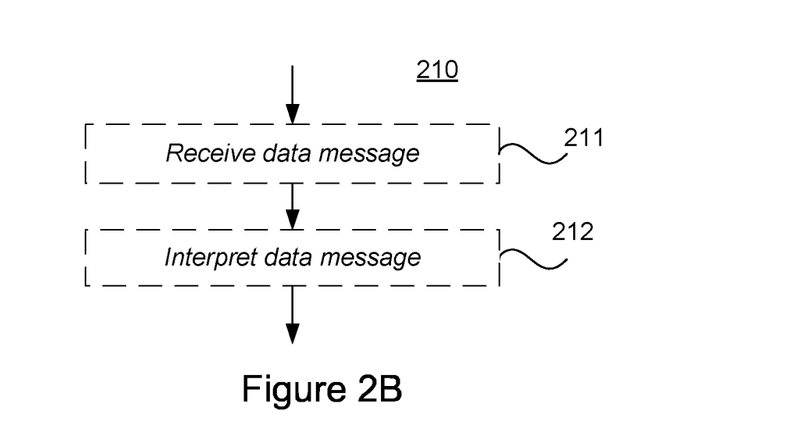

Reference is now made to FIG. 2B, which illustrates optional acts or steps of determining 210 that the operational status of the UE is an operational status where the UE is in transition from the idle mode to the connected mode. A data message indicative of the UE requesting a transition from the idle mode to the connected mode may be received 211. This data message may for example be a random access message 1 (i.e. RA Msg1, see e.g. FIG. 1). Thus, the RA Msg1 may comprise a random access preamble. Alternatively, the data message may for example be a random access message 3 (i.e. RA Msg3, see e.g. FIG. 1). Thus, the RA Msg3 may comprise a RRCConnectionRequest message. Also, the received data message may be interpreted 212 by the radio network node as an indication that the UE is in transition from an idle mode to a connected mode.

Referring again to FIG. 2A, an advantageous embodiment will now be described. Optionally, the method 200 may additionally comprise predicting 220 one or several data messages that the UE will transmit to the radio network node during its transition from idle mode to connected mode. There are different ways to predict these data messages. For example, the prediction may be based on the notion that many of the data messages which are signaled during the idle to connected mode transition are standardized and thus relatively predictable. FIG. 1 shows one exemplary signaling diagram illustrating example messages signaled during an idle-to-connected mode transition in LTE. Many of the data messages which are signaled during the idle to connected mode transition are standardized by 3GPP in technical specifications (see e.g. 3GPP TS 36.331, 3GPP TS 23.401, 3GPP TS 36.321, 3GPP TS 24.301, 3GPP TS 36.413). Consequently, the radio network node may for example be pre-configured with data or information relating to the data messages that are signaled during an idle-to-connected mode transition according to the technical specifications. The radio network node can then base its prediction on such pre-configured data or information. Some data messages (e.g. Non-Access Stratum (NAS) messages) are optional in the technical specifications. The signaling of such optional messages are generally determined, or otherwise decided, by operators. The use of such optional messages are oftentimes configured (by the operator) in other radio network entities such as in the MME. Thus, the radio network node may collect data relating to such optional messages signaled during the idle-to-connected mode transition by receiving this data from a MME and, thus, base its prediction also on this received data. Alternatively, or additionally, the radio network node may be configured by an operator with information about usage of optional messages signaled during the idle-to-connected mode transition.

Figure 2C:
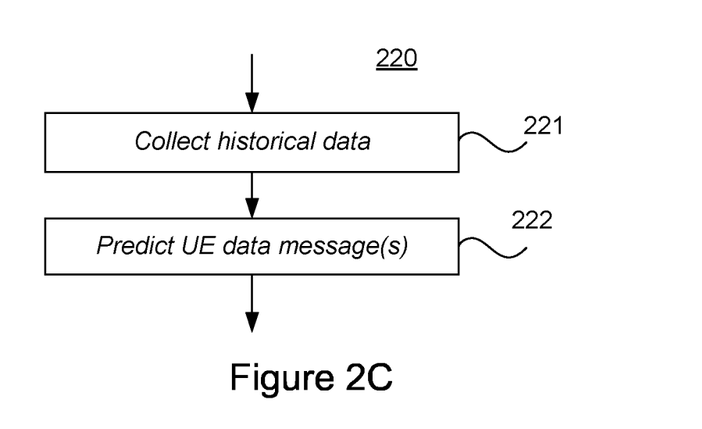

Referring now to FIG. 2C, there is shown one example embodiment for predicting 220 one or several data messages that the UE will transmit to the radio network node during its transition from idle mode to connected mode. First, historical data of data messages communicated by one or several UEs during previous transitions from idle mode to connected mode is collected 221. Some or all of the historical data can be collected from an internal memory of the radio network node if some or all of such historical data is stored in the internal memory of the radio network node. Alternatively, some or all of the historical data can be collected from other radio network nodes such as a MME, as described hereinabove. Yet further, some or all of the historical data could be collected from a combination of the internal memory of the radio network node and the other radio network nodes such as the MME. Yet further, some or all of the historical data may be collected by monitoring such optional messages that are relayed and/or transmitted from and/or received by the radio network node. Once some or all historical data has been collected 221 by the radio network node, the radio network node can predict 222 the one or more data messages that the UE will transmit to the radio network node (during the idle-to-connected mode transition) on the basis of the collected historical data.

Figure 2D:
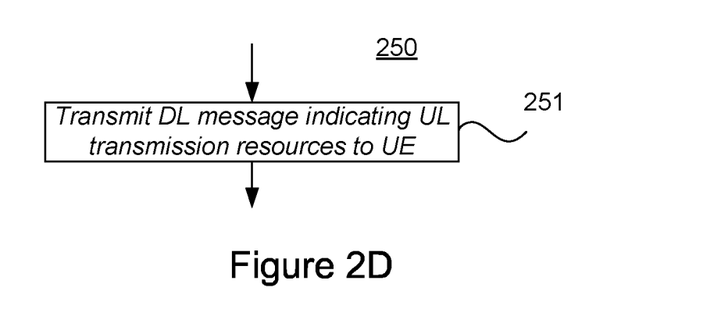

With further reference to FIG. 2A and FIG. 2D, the proactive transmission 250 of the data message indicating the determined radio resource allocation to the UE may comprise transmitting 251 a DL message comprising a data field indicating UL transmission resources allocated to the UE. In one advantageous embodiment, transmitting 251 the DL message comprises transmitting a MAC PDU to the UE, wherein an UL Grant field of the MAC PDU comprises an indication indicating UL transmission resources allocated to the UE. For example, the UL Grant field could be comprised in a MAC Control Element (MAC CE) in a MAC PDU that includes one of the DL RRC messages in the idle to connected mode transition procedure. Such a MAC PDU that includes a higher protocol layer message may have a constitution, or format, which comprises a MAC header, zero or more MAC CEs and zero or more MAC SDUs and optional padding. The MAC header consists of a sub-header for each MAC CE and/or MAC SDU and/or padding included in the MAC PDU. A MAC SDU generally comprises data from a higher protocol layer, e.g. a RRC message. The constitution, or format, of such MAC PDU is disclosed in FIG. 6.1.2-3 of the 3GPP Technical Specification 3GPP TS 36.321, V. 11.0.0.

Figure 3:
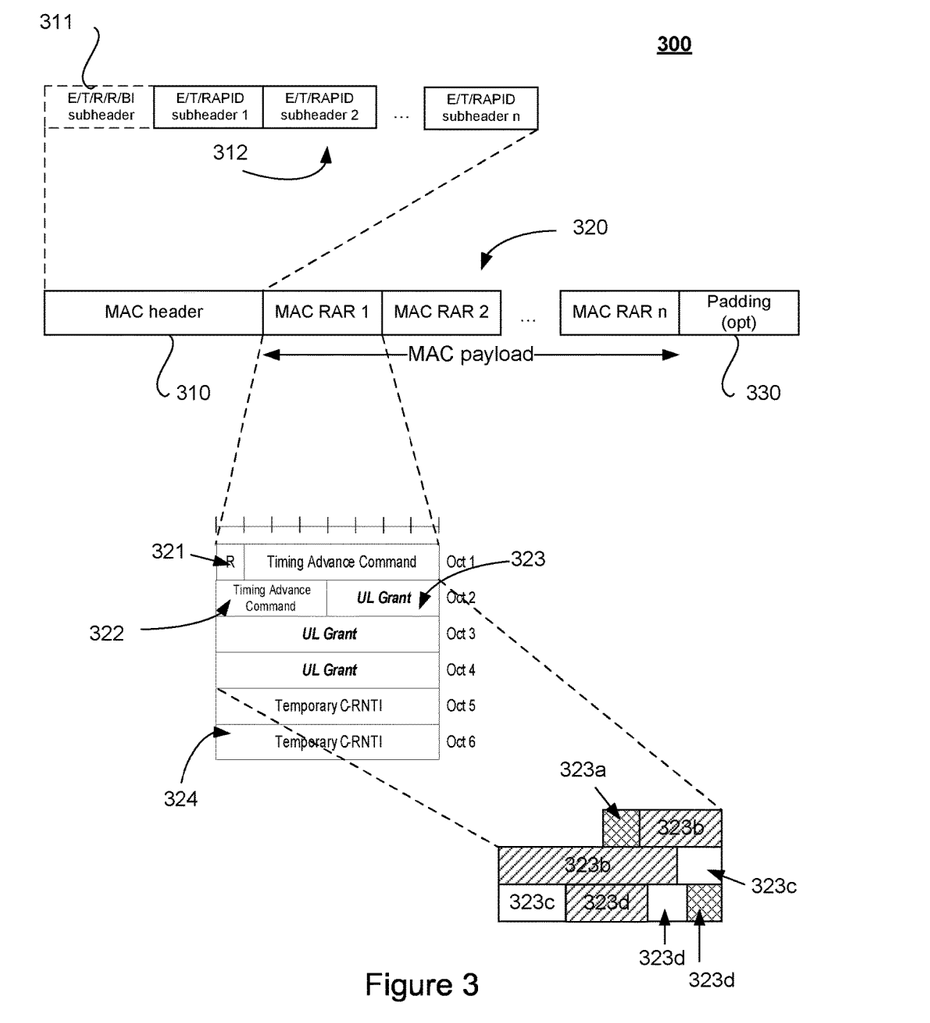
FIG. 3 shows an example constitution, or format, of a MAC PDU.

FIG. 3 shows another example constitution, or format, of a MAC PDU 300 that comprises an indication indicating UL transmission resources allocated to the UE. The MAC PDU 300 depicted in FIG. 3 is generally tailored for conveying Random Access Response messages and is different from the above described type of MAC PDU that is used for conveying higher protocol layer messages. As is specified in 3GPP TS 36.321 V11.0.0, the MAC PDU 300 shown in FIG. 3 comprises a MAC header 310 and zero, one or more MAC RARs 320. The MAC RARs 320 are so-called payload fields. Optionally, a padding field 330 can be included. The MAC header 310 has a variable length and includes at least one MAC subheader 311, 312. Each subheader 312 except a Backoff indicator (BI) subheader 311 corresponds to one MAC RAR. If included, the BI subheader 311 may be the first subheader included within the MAC header 310. The BI subheader 311 may comprise five header fields, i.e. an E field of one bit, a T field of one bit, a BI field of four bits, and reserved (R) fields of two bits. In general, such a structure is referred to as an E/T/R/R/BI structure. Here, the E field is an extension field indicating whether or not an additional field is in the MAC header 310. For example, where the E field is set to 1, there are follow-up E/T/RAPID (Random Access Preamble IDentifier) fields 312. Where the E field is set to 0, MAC RARs 320 or padding 330 is started from the next byte. The T field is a type flag indicating whether or not the MAC subheader 311 has an access ID (i.e. is a RAPID subheader corresponding to a MAC RAR) or BI. In a general message, 0 is used as a R bit. In other words, a general UE may perform a procedure irrespective of the R fields included in the MAC RAR. Furthermore, the MAC subheaders denoted 312 may comprise three header fields, i.e. an E field of one bit, a T field of one bit and a RAPID field of six bits. Here, the RAPID field indicates identification (ID) of a transmitted RAR. In general, such a structure is referred to as an E/T/RAPID structure. A MAC RAR 320 generally comprises four fields, as defined in Technical Specification 3GPP TS 36.321 V.11.0.0 and as exemplified in lower portion of FIG. 3. Each MAC RAR generally comprises six octets, each octet comprising eight bits as is also illustrated in FIG. 3. A first field 321 is generally a reserved (R) field of one bit. A second field 322 is generally a Timing Advance Command field of, e.g., eleven bits. A third field 323 generally comprises an UL grant field. The third field 323 is generally of 20 bits. Finally, a fourth field 324 generally comprises the Temporary C-RNTI (Cell Radio Network Temporary Identifier). The fourth field 340 is generally of 16 bits. According to one example embodiment of this invention, the radio network node manipulates 240 (see FIG. 2A) the content of the regular UL Grant field 323 as defined by the 3GPP TS 36.321 by altering one or more bits of this regular UL Grant field 323 to include the earlier-mentioned indication indicating UL transmission resources allocated to the UE.

There are various conceivable ways of altering one or more bits of this regular UL Grant field 323 to include the earlier-mentioned indication indicating UL transmission resources allocated to the UE, some of which will be described now. A regular Grant field 323 may comprise a Frequency Hopping field 323a, a Resource Block Allocation field 323b, a Modulation and Coding Scheme (MCS) field 323c, a Transmit Power Control (TPC) Command field 323d, a Channel State Information (CSI) request field 232d, and a UL Delay field 323e. In one embodiment, the content of the regular UL Grant field 323 is manipulated by altering one or more bits of the MCS field 323c and/or the UL Delay field 323e. In one embodiment, it is also possible to alter one or more bits of this regular UL Grant field 323 to include an indication indicating a point in time when the allocated UL transmission resources allocated to the UE are to be utilized by the UE. It should be appreciated that the above-mentioned point in time may be a time period with a pre-defined duration. That is, it would be possible to alter one or more bits of this regular UL Grant field 323 to include an indication indicating a time period during which the allocated UL transmission resources allocated to the UE are to be utilized by the UE. For example, the above-mentioned point in time could be expressed as a certain (e.g., predefined) number of subframes ahead in time (i.e. in the future). Generally, the precise time between reception of a UL Grant and the allocated UL transmission resources is expressed as a number of subframes (of one millisecond each) minus a Timing Advance (TA) value, i.e. $N \times T_{subframe} - T_A$ where N is the number of subframes, $T_{subframe}$ is the time length of a subframe (e.g. 1 ms) and $T_A$ is the TA value.

However, for simplicity and in order not obscure the description unnecessarily much such time is referred to as a number of subframes (or, alternatively, a number of milliseconds) throughout this disclosure. Again, it would be possible to alter one or more bits of this regular UL Grant field 323 to include an indication indicating a time period during which the allocated UL transmission resources allocated to the UE are to be utilized by the UE. For example, the UL Delay field 323e could be extended from 1 bit to multiple bits, e.g. 5 bits to enable a range of potentially indicated number of subframes. Another possible option would be to utilize the existing UL Delay field 323e of 1 bit as is, but allowing it to adopt a different interpretation when embodiments of the present invention are carried out. For example, the delay (i.e. the number of subframes) indicated by the UL delay field 323e may be chosen to have either value 0 or value 1, wherein the respective values 0 and 1 refer to different suitable values (e.g. value 0 meaning 50 ms and value 1 meaning 100 ms).

As an example, the UL grant field 323 utilized and illustrated in FIG. 3 may differ from a regular UL grant field as transmitted on the PDCCH (Physical Downlink Control Channel) in that its MCS field 323c consists of 4 bits instead of 5 bits. Such a 4 bit MCS field may be referred to as a truncated MCS field. One optional way of manipulating a regular UL grant of FIG. 3, according to some embodiments of the present invention, may e.g. comprise extending the truncated MCS field 323c of the UL grant field 323 depicted in FIG. 3 from 4 bits to 5 bits. This could enable the UL grant field 323 to indicate all the 32 possible values of an MCS field in an UL grant field 323 transmitted on the PDCCH (Physical Downlink Control Channel).

As will be appreciated, a regular UL grant field 323 can thus be altered to include an indication indicating UL transmission resources allocated to the UE and/or an indication of a point in time when allocated UL transmission resources are to be utilized by the UE. The indication of the point in time when allocated UL transmission resources are to be utilized by the UE may be an explicit indication e.g. indicating a certain number of subframes (ahead in time) when allocated UL transmission resources are to be utilized by the UE. Alternatively, the indication may be an implicit indication. If utilizing an implicit indication, it may be advantageous if the point in time when allocated UL transmission resources are to be utilized by the UE is known to the UE in advance in some way. For example, in some embodiments it is conceivable that the point in time (e.g. expressed as number of subframes ahead in time) when allocated UL transmission resources are to be utilized by the UE is pre-configured into an internal memory of the UE. Another option is that the radio network node transmits (e.g. broadcasts) a System Information (SI) message to multiple UEs. This SI message may include a data field indicating the point in time (e.g. expressed as a number of subframes ahead in time starting from the reception of the message including the indication of the allocated resources) when allocated UL transmission resources allocated to the UE are to be utilized.

An alternative way of conveying, or transmitting, the indication indicating UL transmission resources allocated to the UE, is that the radio network node sends an UL grant on the PDCCH in the same subframe as it transmits the scheduling assignment for a DL message (and sends the actual DL message). In this alternative embodiment the regular UL grant format that is used for regular UL transmission resource allocations transmitted on the PDCCH could be modified to provide an explicit or implicit indication of that the indicated transmission resources are allocated a certain number of subframes, or milliseconds, ahead in time (i.e. the time period between the reception of the indication on the PDCCH and the point in time when the indicated allocated resources should be utilized by the UE). This indication may include the explicit number of subframes, or milliseconds, or may require that the number of subframes, or milliseconds, be known from another source, such as the system information or hardcoded in the UE and the radio network node based on a standardized value.

Figure 4:
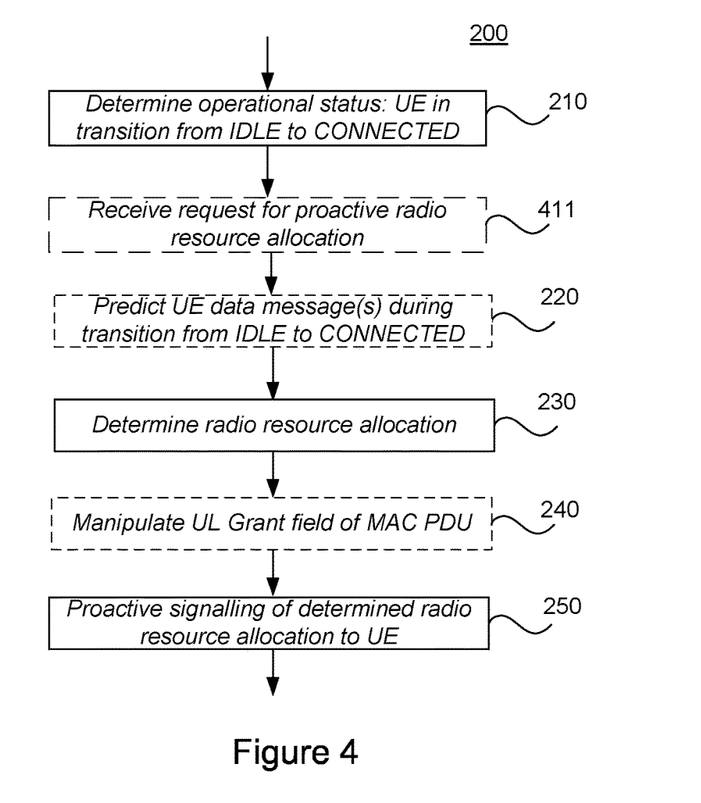
FIG. 4 shows a flowchart of an example method performed by a radio network node.

When carrying out proactive resource allocation during a time period when a UE is in transition from an idle mode (e.g. RRC_IDLE) to a connected mode (RRC_CONNECTED) as described hereinabove, it may be advantageous to utilize some kind of trigger mechanism. FIG. 4 shows one example method utilizing a triggering mechanism. The illustrated acts, or steps, are the same or substantially the same as the corresponding steps described earlier with respect to FIG. 2 and will therefore not be repeated here. According to this embodiment, the method additionally comprises receiving 411 a data message from the UE, said data message comprising an indication to the radio network node that the UE requests the radio network node to determine a radio resource allocation for the UE taking the transition from the idle mode to the connected mode of the UE into consideration. Thus, this data message can be seen as a data message comprising an indication to the radio network node that the UE requests the radio network node to determine a radio resource allocation for the UE and proactively return (i.e. transmit) a data message indicating the determined radio resource allocation to the UE and optionally repeat such proactive resource allocation for further messages during the idle to connected mode transition. Determining 230 the radio resource allocation for the UE may be performed in response to, or as a consequence of, receiving 411 said data message comprising the indication that the UE requests the radio network node to determine the radio resource allocation for the UE taking the transition from the idle mode to the connected mode of the UE into consideration. It should be appreciated that the acts, or steps, illustrated in FIG. 4 do not necessarily have to be performed in the illustrated order. For example, the above-mentioned data message including the request to utilize proactive transmission of the resource allocation may be received 411 prior to act 210. Alternatively, the reception 411 of this data message can be performed subsequent to act 220.

Figure 5:
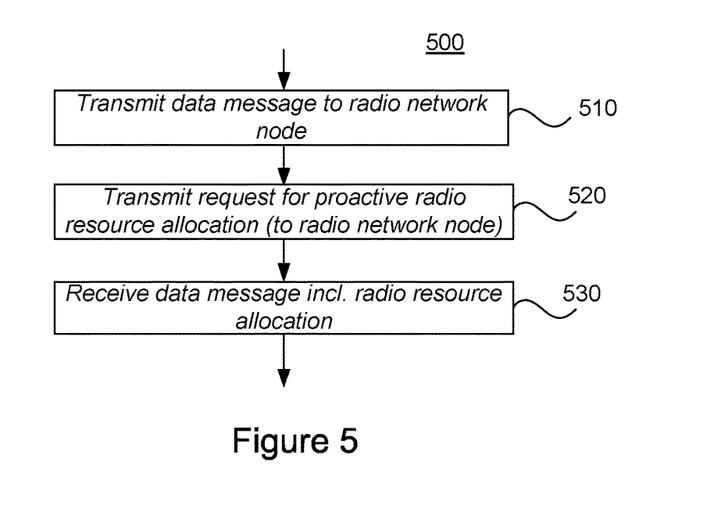
FIG. 5 shows a flowchart of an example method performed by a user equipment.

As will be appreciated from the above, the technology presented herein also concerns a corresponding method performed by the UE as is schematically illustrated in FIG. 5. The method 500 illustrated in FIG. 5 comprises transmitting 510 a first data message to a radio network node, the first data message being indicative of the UE requesting a transition from an idle mode to a connected mode. The method also comprises transmitting 511 a second data message, which second data message comprises an indication that the UE requests the radio network node to determine a radio resource allocation for the UE taking the transition from the idle mode to the connected mode of the UE into consideration. Thus, this second data message can be seen as a data message comprising an indication to the radio network node that the UE requests the radio network node determine a radio resource allocation for the UE and proactively return (i.e. transmit) a data message indicating the determined radio resource allocation to the UE. In response, the method 500 comprises receiving 530 a third data message including a radio resource allocation from the radio network node. The first data message and the second data message may be separate messages. Alternatively, the first and second messages could the same data message. That is, the first and second data messages can be transmitted as a single data message. Also, the acts (or steps) illustrated in FIG. 5 do not necessarily have to be performed in the illustrated order. For example, act 520 could be performed prior to act 510.

Various Conceivable Triggering Mechanisms

There exist various conceivable mechanisms for triggering the utilization of a proactive resource allocation as described hereinabove. Some of these mechanisms will now be exemplified.

One possible triggering mechanism is that the UE indicates in the RRCConnectionRequest message (see FIG. 1) that it prefers, or accepts, that a proactive transmission of a determined resource allocation (as described hereinabove) is utilized. One possible way to include the indication in the RRCConnectionRequest RRC message could be to utilize one or both of the spare values of the existing establishmentCause information element (IE). Using one spare value could enable indication of preference and/or acceptance of the proactive resource allocation. Using both spare values could provide the possibility to indicate not only preference and/or acceptance of the proactive resource allocation but also the number of subframes between the allocation of the resources and the occurrences of them, i.e. the point in time (expressed as a number of subframes ahead in time from the reception of the message including the resource allocation) when the UE should utilize the allocated transmission resources. Also, it is conceivable to change the interpretation of the value of the establishmentCause IE that currently indicates 'delay tolerant access' so that it also indicates that the proactive resource allocation described herein is preferred and/or accepted by the UE.

Yet another option in combination with an indication in the RRCConnectionRequest message could be that the indication triggers the eNB to configure the number of subframes to be used between a proactive resource allocation and the actual occurrence of the transmission resource (i.e. the point in time when the UE should utilize the allocated resource) in the RRConnectionSetup message.

Another possible way to trigger the use of the proactive resource allocation is that the UE indicates in the RRCConnectionSetupComplete RRC message (see FIG. 1) that it prefers, or accepts, that the proactive resource allocation feature is utilized.

Still another possible way to trigger the use of the proactive resource allocation feature is to include in the subscriber data in a Home Subscriber Server (HSS) that the proactive resource allocation feature should be used for the UE in question. A corresponding indication may also be stored in the Universal Subscriber Identity Module (USIM) in the UE. In combination with such an indication in the subscriber data, there may also be an indication of the number of subframes to be used between the proactive resource allocation and the actual occurrence of the resources. If utilized, such an indication of the number of subframes may in itself constitute the indication that the proactive resource allocation feature as described herein should be used for the UE in question. The indication may for example be downloaded from the HSS to the MME together with other subscriber data when the UE registers in the MME. From the MME the indication could be forwarded (i.e. transmitted) to the eNB in a first message from the MME to the eNB during the idle to connected mode transition procedure, e.g., the Initial Context Setup Request S1AP message (message 17 in the message sequence of FIG. 1) or the Downlink NAS Transport S1AP message carrying the Authentication Request NAS message (message 9 in the message sequence of FIG. 1). Compared to the earlier-described trigger alternatives using RRC messages, this alternative may trigger the use of the proactive resource allocation later in the idle to connected mode transition procedure, but if the Downlink NAS Transport S1AP message carrying the Authentication Request NAS message is used, then there are still several UL transmissions that may benefit from advantages of the embodiments disclosed throughout this disclosure.

Yet another possible way to trigger the use of the proactive resource allocation described in this disclosure is that the UE indicates in a NAS message to the MME that it prefers, or accepts, the use of the proactive resource allocation during its transition from idle to connected mode. The NAS message should advantageously be the one that is included in the RRCConnectionSetupComplete RRC message (i.e. message 5 in the message sequence of FIG. 1). In FIG. 1, this NAS message is a Service Request NAS message, but in other scenarios it may also be another NAS message, such as an Attach Request NAS message, an Extended Service Request NAS message or a Tracking Area Update Request NAS message. Advantageously, the UE should inform the MME by including the information already in the Attach Request NAS message when the UE attaches to the network. The MME should store the information in the UE context and forward it to the new MME in case of a subsequent MME relocation. If the MME later receives new information from the UE, e.g. in one of the NAS messages Service Request or Tracking Area Update Request, the new information should replace the old one in the MME.

In order to inform the eNB, the MME may forward (i.e. transmit) the indication to the eNB in the Initial Context Setup Request S1AP message (i.e. message 17 in the message sequence FIG. 1) or the Downlink NAS Transport S1AP message carrying the Authentication Request NAS message (i.e. message 9 in the message sequence of FIG. 1).

Yet another possible way to trigger the use of the proactive resource allocation as described herein is that the UE indicates in a NAS message to the MME that it prefers, or accepts, the use of the proactive resource allocation feature. Wth this alternative the indication may be associated with a category or capability of the UE. It could then be included in any of the IEs in the Attach Request NAS message that indicates various properties of the UE, i.e. the UE network capability IE, the MS network capability IE, the Mobile station classmark 2 IE or the Device properties IE. As these IEs are included in a NAS message they may be delivered (i.e. transmitted) to the MME. Hence, the MME may inform the eNB so that the eNB should use the proactive resource allocation as described herein for concerned UE(s). The MME preferably carries this out by forwarding the indication to the eNB in the Initial Context Setup Request S1AP message (i.e. message 17 in the message sequence of FIG. 1 or the Downlink NAS Transport S1AP message carrying the Authentication Request NAS message (i.e. message 9 in the message sequence of FIG. 1).

Another possible alternative of basing this on the UE capability is to make use of radio capability related parameters. In such alternative, the UE-EUTRA-Capability IE may for example be extended with the indication that the UE prefers, or accepts, the proactive resource allocation as described in this disclosure.

In combination with the Attach procedure (i.e. when the UE first registers in the radio network and relevant contexts are established in core network nodes, such as the MME, the Serving Gateway (SGW) and the Packet Data Network Gateway (PGW)) the eNB may request the capability information from the UE by e.g. transmitting the RRC message UECapabilityEnquiry to the UE. The UE may then respond with the RRC message UECapabilityInformation, including the capability information as described above. The eNB may then forward (i.e. transmit) the information to the MME as follows. It may include the UECapabilityInformation message in a ue-RadioAccessCapabilityInfo IE, which it includes in a UERadioAccessCapabilityInformation message (which may be specified as an RRC message), which in turn is included in a UE Radio Capability IE, which the eNB then sends to the MME in the S1AP message UE Capability Info Indication. The MME stores the UE capability information in its UE context and keeps it for as long as the UE remains attached to the network (and transfers it to a new MME in case of MME relocation).

In subsequent cases (during the same attach session) where the UE connects to the network, i.e. transitions from idle to connected mode, the MME may transfer the UE capability information to the eNB in the in the UE Radio Capability IE in the S1AP message Initial Context Setup Request (message 17 in the message sequence in FIG. 1). The UE Radio Capability IE is optional in the Initial Context Setup Request message and during the Attach procedure it may be absent. This absence may e.g. trigger the eNB to request the information from the UE and forward it to the MME.

Still another possible way to trigger the use of the proactive resource allocation as described herein is that the UE indicates in a MAC Control Element that it prefers, or accepts, the use of the proactive transmission resource allocation feature. The MAC Control Element could advantageously be included in a MAC PDU carrying one of the uplink RRC messages, e.g. the RRCConnectionRequest RRC message or the RRCConnectionSetupComplete RRC message, but it could also be signalled in a separate MAC PDU. A MAC PDU that includes a higher layer message, such as a RRC message is a more general type of MAC PDU than the MAC PDU that is dedicated for Random Access Response messages depicted in FIG. 3. This more general MAC PDU may have a constitution, or format, which comprises a MAC header, zero or more MAC Control Elements and zero or more MAC SDUs and optional padding. The MAC header consists of a sub-header for each MAC Control Element and/or MAC SDU and/or padding included in the MAC PDU. A MAC SDU contains data from a higher protocol layer, e.g. a RRC message. The constitution, or format, of this more general MAC PDU is disclosed in FIG. 6.1.2-3 of the 3GPP Technical Specification 3GPP TS 36.321, V. 11.0.0.

Yet another possible way to trigger the use of the proactive resource allocation is that the UE indicates preference, or acceptance, of the proactive resource allocation in the RA Msg1, i.e. the first message in the random access procedure (see e.g. FIG. 1). A possible way to indicate this by utilizing the RA Msg1 is to use a preamble from a dedicated group of preambles, wherein the preambles of this dedicated group are defined to have a special meaning, i.e. in this case that the UE sending the preamble prefers, or accepts, the use of the proactive resource allocation as described in this disclosure. For example, the currently used two preamble groups, A and B, could be complemented with another preamble group for this purpose. This special preamble group would then preferably be announced in the system information (SI) that is broadcast in the cell.

If the indication is to be combined with, or have the additional purpose of, indicating the number of subframes to be used between the proactive transmission of the resource allocation and the actual occurrence of the utilization of UL transmission resources, then multiple dedicated preamble groups could be defined, one for each value that should be possible to indicate for the number of subframes.

Yet another option in combination with the use of a dedicated preamble group could be that the UE indicates preference, or acceptance, of the proactive transmission of resource allocation through the use of a random access preamble from a dedicated preamble group in RA Msg1 and the eNB responds in RA Msg2 (see FIG. 1) by configuring the UE with the number of subframes to be used between a proactive transmission resource allocation and the actual occurrence of the transmission resource.

Additional Conceivable Embodiments

Proactive Resource Allocation for DL Messages:

The proactive transmission resource allocation as described hereinabove may be extended to comprise also allocation of transmission resources for the DL messages of the idle to connected mode transition procedure. This would relieve the UE of having to monitor the PDCCH for DL scheduling assignments. A proactive DL transmission resource allocation could occur in combination with the preceding DL message transmission, i.e. simultaneously with the proactive UL transmission resource allocation for the UL message preceding the concerned DL message. An alternative to performing the proactive DL transmission resource allocation in combination with the preceding DL message transmission is to do it in combination with transmission of HARQ (Hybrid Automatic Repeat Request) feedback on a preceding UL message. Preferably then in the form of a modified scheduling assignment on the PDCCH and preferably in combination with a positive HARQ feedback (i.e. a HARQ ACK) which preferably indicates the successful reception of the entire UL message.

Variable Proactive Resource Allocation Delay:

The optimal number of subframes to be used when carrying out the embodiments described herein should be tested and evaluated for each specific case. The optimal number of subframes between a proactive transmission resource allocation and the occurrence of the allocated resources may be different for different messages. It may, for example, depend on the processing time needed in the UE for the preceding DL message and/or the processing time needed for preparing a certain UL message for transmission. Taking this into account it would be possible to use different number of subframes between the proactive transmission resource allocation and the actual occurrence of the allocated resources for different messages.

Proactive Allocation of Transmission Resources for Multiple Messages Simultaneously:

An option could be that the radio network node may proactively allocate transmission resources to several future (UL and/or DL) messages in the same message, i.e. in one single data message. The type of message could be as indicated herein, i.e. a MAC PDU. The point in time for each of such multiple resource allocations to occur, i.e. the point in time when the allocated resource should be used, could be expressed as a number of subframes from the reception of the allocation. Alternatively, in the case of UL transmission resources, the point in time of utilization could be expressed as a number of subframes from the reception of the preceding DL message. Correspondingly, in case of DL transmission resources, the point in time of utilization may be expressed as a number of subframes from the transmission of the preceding UL message. The point in time of the transmission of the preceding UL message may be defined as the point in time of reception of a HARQ acknowledgement indicating that the eNB has successfully received the complete UL message.

Radio Network Node

Figure 6:
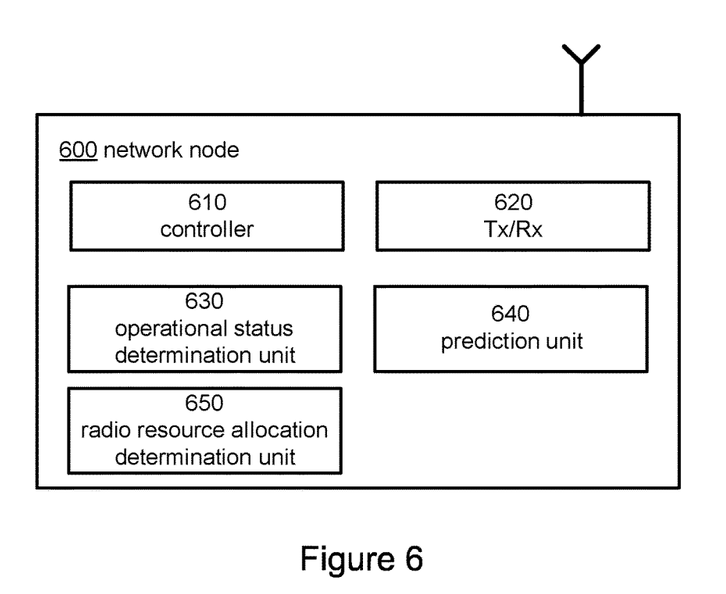
FIG. 6 shows an example implementation of a radio network node.

The methods described with respect to FIGS. 2-4 may be implemented in a radio network node, such as an eNB. FIG. 6 provides an example embodiment of a radio network node 600. The radio network node 600 may include a controller 610, a transmitter (Tx) and/or receiver (Rx) 620, an operational status determination unit 630, a prediction unit 640 and a radio resource allocation determination unit 650.

The operational status determination unit 630 is configured to determine that an operational status of a UE is an operational status where the UE is in transition from an idle mode to a connected mode. The radio resource allocation determination unit 650 is configured to determine a radio resource allocation for the UE. A transmitter 620 is configured to proactively transmit a data message indicating the determined radio resource allocation to the UE. The transmitter 620 may e.g. be configured to proactively transmit the data message indicating the determined radio resource allocation to the UE by transmitting a DL message comprising a data field indicating UL transmission resources allocated to the UE. The DL message may comprise a MAC PDU, wherein an UL Grant field of the MAC PDU comprises an indication indicating UL transmission resources allocated to the UE, as described hereinabove. In one embodiment, the radio resource allocation unit 650 is configured to manipulate a content of a regular UL Grant field of the MAC PDU by altering one or more bits of the regular UL Grant field to include the indication indicating UL transmission resources allocated to the UE. The indication indicating UL transmission resources allocated to the UE may additionally comprise an indication indicating a point in time (e.g. expressed as a number of subframes ahead in time from the reception of the message including the indication) when the allocated UL transmission resources allocated to the UE are to be utilized by the UE. Additionally, or alternatively, the transmitter (Tx) 620 may be configured to transmit a SI message to the UE (and other UEs), wherein the SI message comprises a data field indicating a point in time when allocated UL transmission resources allocated to the UE (and the other UEs) are to be utilized by the UE (e.g. expressed as a number of subframes ahead in time from the reception of the message including the indication).

In advantageous embodiments, an optional prediction unit 650 may be configured to predict one or more data messages the UE will transmit to the radio network node during its transition from the idle mode to the connected mode. The radio resource allocation determination unit 650 may be further configured to determine the radio resource allocation for the UE on the basis of one or more data messages predicted by the prediction unit 650.

Furthermore, the optional prediction unit 650 may be configured to collect historical data of data messages communicated by one or several UEs during previous transitions from idle mode to connected mode; and predict the one or more data messages that the UE will transmit to the radio network node on the basis of the collected historical data.

In some embodiments, the receiver 620 is configured to receive a data message from the UE, said data message comprising an indication or request to the radio network node 600 that the UE requests the radio network node 600 to determine a radio resource allocation for the UE taking the transition from the idle mode to the connected mode of the UE into consideration. The radio resource allocation determination unit 650 may thus be configured to determine the radio resource allocation for the UE in response to the receiver 620 receiving this data message.

Figure 7:
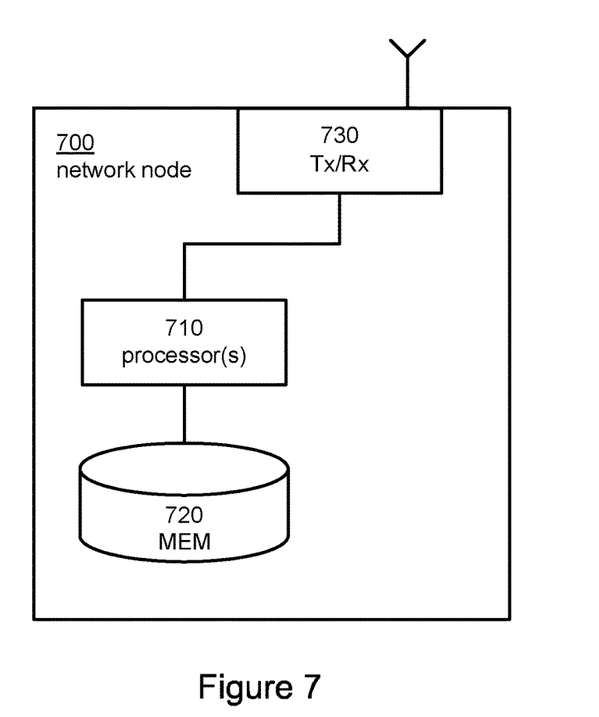
FIG. 7 shows another example implementation of radio network node.

FIG. 6 provides a logical view of an example radio network node and the components included therein. It is not strictly necessary that each component be implemented as physically separate modules. Some or all components may be combined in a physical module. Also, the components of the radio network node need not be implemented strictly in hardware. It is envisioned that the components can be implemented through any combination of hardware and software. For example, as illustrated in FIG. 7, the radio network node 700 may include one or more hardware processors 710, one or more memories 720 (internal, external, or both), and a transceiver 730. The transceiver may comprise a transmitter functionality (Tx) and a receiver functionality (Rx). The one or more memories 720 may thus store computer program code, which, when run in the one or more processors 710, causes the radio network node 700 to determine that an operational status of a UE is an operational status where the UE is in transition from an idle mode to a connected mode; in response thereto determine a radio resource allocation for the UE; and proactively transmit a data message indicating the determined radio resource allocation to the UE.

User Equipment

Figure 8:
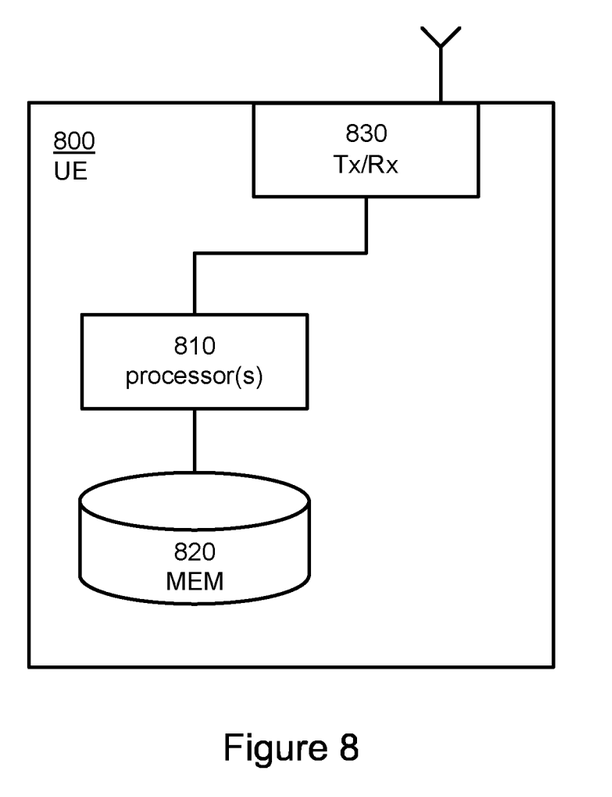
FIG. 8 shows an example implementation of a user equipment.

The methods described with respect to FIG. 5 may be implemented in a user equipment (UE). FIG. 8 provides an example embodiment of a UE 800. The UE 800 may comprise one or more hardware processors 810, one or more memories 820 (internal, external, or both), and a transceiver 830. The transceiver may comprise a transmitter functionality (Tx) and a receiver functionality (Rx). A transmitter may be configured to transmit a first data message to a radio network node, wherein the first data message is indicative of the UE requesting a transition from an idle mode to a connected mode. Furthermore, the transmitter may be configured to transmit a second data message, which comprises an indication that the UE requests the radio network node to determine the radio resource allocation for the UE taking the transition from the idle mode to the connected mode of the UE into consideration. Also, a receiver may be configured to receive a third data message including a radio resource allocation from the radio network node in response to the transmitter having transmitted the first and/or second data messages.

According to the various embodiments disclosed throughout this disclosure, the inventor propose a proactive resource allocation during a time period when a UE is in transition from an idle mode (e.g. RRC_IDLE) to a connected mode (RRC_CONNECTED). By employing the proactive resource allocation presented herein, there is no need for the UE to first transmit a scheduling request to the radio network node. As a consequence, the UE may also be relieved from monitoring the Physical Downlink Control Channel (PDCCH) that is normally monitored for UL grants (preceding UL transmissions during the idle-to-connected mode transition) in response to the UE having transmitted the scheduling request. This may allow the UE to save battery power, since the UE can reduce its energy consumption. After having received a proactive transmission of the data message indicating the allocated radio resources in accordance with embodiments disclosed herein, the UE can skip the normal transmission of the scheduling request and the normal monitoring of the PDCCH and instead enter or remain in sleep mode until a subsequent transmission of a next UL message.

In the detailed description hereinabove, for purposes of explanation and not limitation, specific details are set forth such as particular architectures, interfaces, techniques, etc. in order to provide a thorough understanding of various embodiments of the present invention. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Although the present invention has been described above with reference to specific embodiments, it is not intended to be limited to the specific form set forth herein. For example, while the various embodiments have been described with respect to LTE, it will come to mind to one skilled in the art having benefit of the teachings presented in the foregoing description and associated drawings that the embodiments presented herein can equally possible be used in e.g. UMTS. Also, while one example constitution, or format, of a MAC PDU has been illustrated and described in combination with FIG. 3, it should be appreciated that the embodiments described herein are not limited to that specific example. It will thus come to mind to one skilled in the art having benefit of the teachings presented in the foregoing description and associated drawings that the embodiments presented herein can equally possible make use of alternative MAC PDU formats. One conceivable MAC PDU format, or constitution, is the MAC PDU as disclosed in FIG. 6.1.2-3 of the 3GPP Technical Specification 3GPP TS 36.321, V. 11.0.0, as outlined hereinabove. Still further, while the various embodiments have mainly been described with respect to proactive transmission of UL transmission resources, it will come to mind to one skilled in the art having benefit of the teachings presented in the foregoing description and associated drawings that the embodiments presented herein can equally possible be extended to DL transmission resources. Consequently, the invention is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method, performed by a radio network node, for radio resource allocation, the method comprising:
   determining that an operational status of a user equipment (UE) is an operational status where the UE is in transition from an idle mode to a connected mode, and in response thereto:
     determining a radio resource allocation for the UE; and
     proactively transmitting a data message indicating the determined radio resource allocation to the UE;
   predicting one or more data messages that the UE will transmit to the radio network node during its transition from the idle mode to the connected mode; and
   determining the radio resource allocation for the UE based on the predicted one or more data messages.

2. The method of claim 1, wherein the determining that the operational status of the UE is an operational status where the UE is in transition from the idle mode to the connected mode comprises receiving a random access message 1 (RA Msg1) from the UE or receiving a random access message 3 (RA Msg3) from the UE.

3. The method of claim 1, wherein the predicting one or more data messages that the UE will transmit to the radio network node during its transition from the idle mode to the connected mode comprises:
  collecting historical data of data messages communicated by one or several UEs during previous transitions from idle mode to connected mode; and
  predicting the one or more data messages that the UE will transmit to the radio network node based on the collected historical data.

4. The method of claim 1, wherein the proactively transmitting the data message indicating the determined radio resource allocation to the UE comprises transmitting a downlink (DL) message comprising a data field indicating uplink (UL) transmission resources allocated to the UE.

5. The method of claim 4, wherein the proactively transmitting a DL message comprises transmitting a Medium Access Control (MAC) Protocol Data Unit (PDU) to the UE, wherein an UL Grant field of the MAC PDU comprises an indication indicating UL transmission resources allocated to the UE.

6. The method of claim 5, further comprising manipulating a content of a regular UL Grant field of the MAC PDU by altering one or more bits of the regular UL Grant field to include the indication indicating UL transmission resources allocated to the U E.

7. The method of claim 5, wherein the indication indicating UL transmission resources allocated to the UE comprises an indication indicating a point in time when the allocated UL transmission resources allocated to the UE are to be utilized by the UE.

8. The method of claim 4, further comprising transmitting a System Information (SI) message to the UE, wherein the SI message comprises a data field indicating a point in time when allocated UL transmission resources allocated to the UE are to be utilized by the UE.

9. The method of claim 1, further comprising receiving a data message from the UE, the data message comprising an indication to the radio network node that the UE requests the radio network node to determine a radio resource allocation for the UE taking the transition from the idle mode to the connected mode of the UE into consideration.

10. The method of claim 9, wherein the determining the radio resource allocation for the UE is performed in response to receiving the data message comprising the indication that the UE requests the radio network node to determine the radio resource allocation for the UE taking the transition from the idle mode to the connected mode of the UE into consideration.

11. A method of operating a user equipment (UE), the method comprising the UE:
  transmitting a first data message to a radio network node, the first data message being indicative of the UE requesting a transition from an idle mode to a connected mode;
  transmitting a second data message comprising an indication that the UE requests the radio network node to determine a radio resource allocation for the UE taking the transition from the idle mode to the connected mode of the UE into consideration;
  receiving, in response to the transmitting the second data message, a data message including a radio resource allocation from the radio network node, wherein the radio resource allocation is based on a radio network node prediction of one or more data messages the UE will transmit to the radio network node during its transition from the idle mode to the connected mode.

12. A radio network node for radio resource allocation, the radio network node comprising:
  an operational status determination circuit configured to determine that an operational status of a user equipment (UE) is an operational status where the UE is in transition from an idle mode to a connected mode;
  a radio resource allocation determination circuit configured to determine a radio resource allocation for the UE; and
  a transmitter configured to proactively transmit a data message indicating the determined radio resource allocation to the UE; and
  a prediction circuit configured to predict one or more data messages the UE will transmit to the radio network node during its transition from the idle mode to the connected mode;
  wherein the radio resource allocation determination circuit is configured to determine the radio resource allocation for the UE based on the one or more data messages predicted by the prediction circuit.

13. A user equipment (UE), comprising:
  a transmitter configured to:
    transmit a first data message to a radio network node, the first data message being indicative of the UE requesting a transition from an idle mode to a connected mode;
    transmit a second data message comprising an indication that the UE requests the radio network node to determine the radio resource allocation for the UE taking the transition from the idle mode to the connected mode of the UE into consideration; and
  a receiver configured to receive a third data message including a radio resource allocation from the radio network node, wherein the radio resource allocation is based on a radio network node prediction of one or more data messages the UE will transmit to the radio network node during its transition from the idle mode to the connected mode.

* * * * *